US012645818B2

(12) United States Patent     (10) Patent No.:   US 12,645,818 B2

Radia et al.     (45) Date of Patent:    Jun. 2, 2026

(54) METHOD AND SYSTEM FOR THE IMPLEMENTATION OF AN AUDITABLE LAYER OF PROTECTION FOR DATABASE CONTENT

(71) Applicant: JPMorgan Chase Bank, N.A., New York, NY (US)

(72) Inventors: Rohan Radia, Middlesex (GB); Simon Bench, Bournemouth (GB); James Mark Isger, Dorset (GB); Sowmya Prabhakar, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 156 days.

(21) Appl. No.: 18/375,762

(22) Filed: Oct. 2, 2023

(65) Prior Publication Data

US 2025/0061218 A1    Feb. 20, 2025

(30) Foreign Application Priority Data

Aug. 16, 2023   (IN) ............................. 202311054891

(51) Int. Cl.
    *G06F 21/62*      (2013.01)
    *G06F 21/55*      (2013.01)

(52) U.S. Cl.
    CPC ........ *G06F 21/6218* (2013.01); *G06F 21/552* (2013.01)

(58) Field of Classification Search
    CPC ......... G06F 21/55–554; G06F 21/6218; G06F 21/6227; G06F 21/6245; G06F 21/6281; H04L 63/1408–1425; H04L 63/20
    See application file for complete search history.

(56) References Cited

U.S. PATENT DOCUMENTS

| | | | |
|---|---|---|---|
| 2005/0203881 A1* | 9/2005 | Sakamoto | ............... B29C 48/91 |
| 2022/0217168 A1* | 7/2022 | Singh | .................. H04L 63/1441 |

\* cited by examiner

*Primary Examiner* — Kevin Bechtel

(74) *Attorney, Agent, or Firm* — Greenblum & Bernstein, P.L.C.

(57) ABSTRACT

A system for the management and administration of the integrity of a first set of databases. The system may comprise instructions that, when executed, cause a processor to: monitor the first set of databases to obtain current database activities; obtain a first set of current database activities that comprises a first indication of a first access of a first record within the first set of databases; based on historical first database activities, determine a first set of corresponding recipients that are each respectively associated with a respective set of previous database activities that corresponds to the first set of current database activities; and notify each corresponding recipient from among the first set of corresponding recipients of the first set of current database activities.

20 Claims, 4 Drawing Sheets

100

102

| Processor 104 Instructions | Memory 106 Instructions | Display 108 | Input Device(s) 110 | Medium Reader 112 Instructions | Network Interface 114 | Output Device(s) 116 |

Bus 118

Network 122

120

200

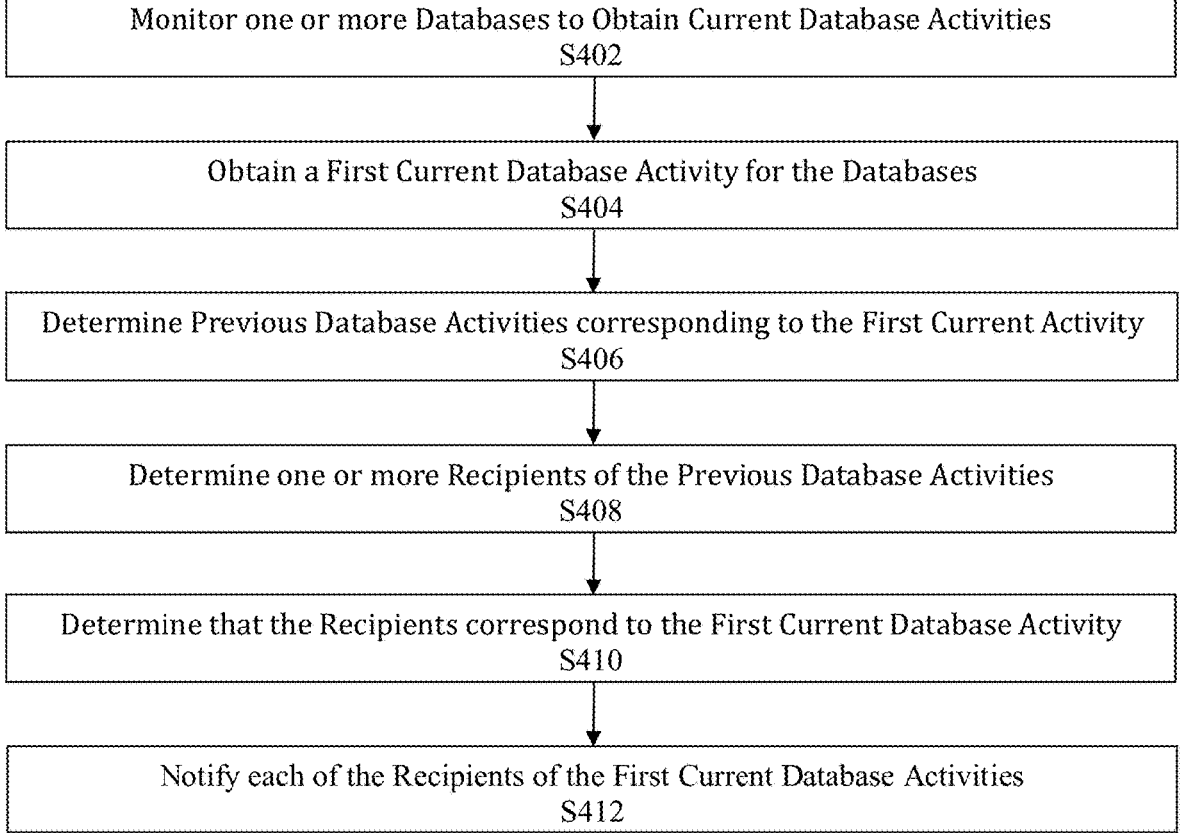

Monitor one or more Databases to Obtain Current Database Activities
S402

Obtain a First Current Database Activity for the Databases
S404

Determine Previous Database Activities corresponding to the First Current Activity
S406

Determine one or more Recipients of the Previous Database Activities
S408

Determine that the Recipients correspond to the First Current Database Activity
S410

Notify each of the Recipients of the First Current Database Activities
S412

FIG. 4

METHOD AND SYSTEM FOR THE IMPLEMENTATION OF AN AUDITABLE LAYER OF PROTECTION FOR DATABASE CONTENT

CROSS-REFERENCE TO RELATED APPLICATIONS

This application claims priority benefit from Indian Application No. 202311054891, filed Aug. 16, 2023, which is hereby incorporated by reference in its entirety.

BACKGROUND

1. Field of the Invention

The field of the invention disclosed herein generally relates to the implementation of an auditable layer of protection for database content and, more particularly, to a method, system, and computer-readable storage medium for incorporating an auditable layer of database content protection technology into the management and administration of one or more databases.

2. Background of the Invention

Database management systems may be utilized in the administration of database content, and these database management systems may utilize a structured query language (SQL) to access such content. Unfortunately, conventional database management systems are subject to the risk that even an authorized user (such as an administrator) may inadvertently (or maliciously) access database content. Under such circumstances, although the authority of such a user may permit them to inadvertently (or maliciously) access database content, reactive/responsive measures may be taken subsequently in order to mitigate the user's inadvertent or malicious access. However, such inadvertent (or malicious) access of database content can easily go unnoticed indefinitely or, at least, until the accessed content is subsequently required.

In addition, based on a set of conditions, a business requirement may allow recipients to subscribe and receive a notification in real-time, whenever a database record is accessed (e.g., read, created or updated). This business requirement may be part of a migration to a new cloud-based platform and may be part of a decommissioning of several legacy platforms, such as HP Service Manager (HPSM). However, conventional cloud-based platforms have a Notification Subscription Engine that does provide a notification to any recipient that has not explicitly subscribed to be notified of an access to a database record that is of interest to the recipient(s). Therefore, conventional Notification Subscription Engines do not notify unsubscribed recipients of an access to a database record that is of interest to the recipients and, as a result, errors may easily be overlooked.

Accordingly, there is a need in the field of the herein-disclosed invention for a technical solution to the foregoing limitation(s) in the technology of existing database management and administration systems.

SUMMARY

The present disclosure, through one or more of its various aspects, embodiments, and/or specific features or sub-component, provides, inter alia, various systems, servers, devices, methods, media, programs and platforms for implementing an auditable layer of protection for database content.

According to an aspect of the present disclosure, a method is provided for implementing an auditable layer of data protection within a database content management and administration tool. The method may comprise: monitoring a first set of databases to obtain current database activities; obtaining a first set of current database activities that comprises a first indication of a first access of a first record within the first set of databases; based on historical first database activities, determining a first set of corresponding recipients that are each respectively associated with a respective set of previous database activities that corresponds to the first set of current database activities; and notifying each corresponding recipient from among the first set of corresponding recipients of the first set of current database activities.

In the method, a first artificial intelligence and machine learning (AI/ML) model may be utilized to perform the determining.

In the method, the historical database activity may have been utilized to train the first AI/ML model to determine whether the historical database activities correspond to the current database activities.

The method may further comprise: monitoring a plurality of sets of databases to obtain the current database activities; and based on respective historical database activities, determining a respective set of corresponding recipients that are each respectively associated with at least one respective previous database activity that corresponds to the current database activities. In the method, a plurality of AI/ML models may be utilized to perform the determining, and each respective AI/ML model from among the plurality of AI/ML models may be respectively utilized to perform the determining for a distinct set from among the plurality of sets of databases to which the respective AI/ML model pertains.

In the method, the determining may comprise: determining that a set of respective sets of previous database activities each respectively correspond to the first set of current database activities; determining at least one respective recipient of each of the respective sets of previous database activities; and identifying the first set of recipients. The first set of recipients may comprise each of the at least one respective recipient of each of the respective sets of previous database activities.

In the method, the notifying may comprise: generating a first ad hoc bulletin of the first set of current database activities that corresponds to the first set of recipients; and transmitting the first ad hoc bulletin to each recipient from among the first set of recipients.

In the method, each of the respective set of previous database activities may comprise at least a threshold amount of past instances of accessing the first record.

In the method, each of the respective set of previous database activities respectively may comprise at least a threshold amount of past instances of accessing at least one respective record that is associated with the first record.

In the method, the first access may comprise a first update of the first record.

In the method, the database management and administration tool may comprise a database activity subscription engine.

According to another aspect of the present disclosure, a system is provided for implementing an auditable layer of data protection within a database content management and administration tool. The system may comprise: a processor;

and memory storing instructions. When executed by the processor, the instructions may cause the processor to perform operations. The operations may comprise: monitoring a first set of databases to obtain current database activities; obtaining a first set of current database activities that comprises a first indication of a first access of a first record within the first set of databases; based on historical first database activities, determining a first set of corresponding recipients that are each respectively associated with a respective set of previous database activities that corresponds to the first set of current database activities; and notifying each corresponding recipient from among the first set of corresponding recipients of the first set of current database activities.

In the system, when the instructions are executed by the processor, a first artificial intelligence and machine learning (AI/ML) model may be utilized to perform the determining.

In the system, the historical database activity may have been utilized to train the first AI/ML model to determine whether the historical database activities correspond to the current database activities.

In the system, the instructions, when executed, may cause the processor to perform further operations that comprise: monitoring a plurality of sets of databases to obtain current database activities; and based on respective historical database activities, determining a respective set of corresponding recipients that are each respectively associated with at least one respective previous database activity that corresponds to the current database activities. In the system, a plurality of AI/ML models may be utilized to perform the determining, and each respective AI/ML model from among the plurality of AI/ML models may be respectively utilized to perform the determining for a distinct set from among the plurality of sets of databases to which the respective AI/ML model pertains.

In the system, when the instructions are executed by the processor, the determining may comprise: determining that a set of respective sets of previous database activities each respectively correspond to the first set of current database activities; determining at least one respective recipient of each of the respective sets of previous database activities; and identifying the first set of recipients. The first set of recipients may comprise each of the at least one respective recipient of each of the respective sets of previous database activities.

In the system, when the instructions are executed by the processor, the notifying may comprise: generating a first ad hoc bulletin of the first set of current database activities that corresponds to the first set of recipients; and transmitting the first ad hoc bulletin to each recipient from among the first set of recipients.

In the system, each of the respective set of previous database activities may comprise at least a threshold amount of past instances of accessing the first record.

In the system, each of the respective set of previous database activities respectively may comprise at least a threshold amount of past instances of accessing at least one respective record that is associated with the first record.

In the system, the first access may comprise a first update of the first record.

In the system, the database management and administration tool may comprise a database activity subscription engine.

According to yet another aspect of the present disclosure, a non-transitory computer-readable medium for implementing an auditable layer of data protection within a database content management and administration tool. The computer-readable medium may store instructions that, when executed by a processor, cause the processor to perform operations that comprise: monitoring a first set of databases to obtain current database activities; obtaining a first set of current database activities that comprises a first indication of a first access of a first record within the first set of databases; based on historical first database activities, determining a first set of corresponding recipients that are each respectively associated with a respective set of previous database activities that corresponds to the first set of current database activities; and notifying each corresponding recipient from among the first set of corresponding recipients of the first set of current database activities.

In the computer-readable medium, when the instructions are executed by the processor, a first artificial intelligence and machine learning (AI/ML) model may be utilized to perform the determining.

In the computer-readable medium, the historical database activity may have been utilized to train the first AI/ML model to determine whether the historical database activities correspond to the current database activities.

In the computer-readable medium, the instructions, when executed, may cause the processor to perform further operations comprising: monitoring a plurality of sets of databases to obtain the current database activities; and based on respective historical database activities, determining a respective set of corresponding recipients that are each respectively associated with at least one respective previous database activity that corresponds to the current database activities. In the computer-readable medium, a plurality of AI/ML models may be utilized to perform the determining, and each respective AI/ML model from among the plurality of AI/ML models may be respectively utilized to perform the determining for a distinct set from among the plurality of sets of databases to which the respective AI/ML model pertains.

In the computer-readable medium, when the instructions are executed by the processor, the determining may comprise: determining that a set of respective sets of previous database activities each respectively correspond to the first set of current database activities; determining at least one respective recipient of each of the respective sets of previous database activities; and identifying the first set of recipients, wherein the first set of recipients comprises each of the at least one respective recipient of each of the respective sets of previous database activities.

In the computer-readable medium, when the instructions are executed by the processor, the notifying may comprise: generating a first ad hoc bulletin of the first set of current database activities that corresponds to the first set of recipients; and transmitting the first ad hoc bulletin to each recipient from among the first set of recipients.

In the computer-readable medium, each of the respective set of previous database activities may comprise at least a threshold amount of past instances of accessing the first record.

In the computer-readable medium, each of the respective set of previous database activities respectively may comprise at least a threshold amount of past instances of accessing at least one respective record that is associated with the first record.

In the computer-readable medium, the first access may comprise a first update of the first record.

In the computer-readable medium, the database management and administration tool may comprise a database activity subscription engine.

Thereby, the invention disclosed herein improves existing technology by incorporating an auditable layer of protection into the management and administration of the content of one or more databases.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for incorporating an auditable layer of protection into the management and administration of database content.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
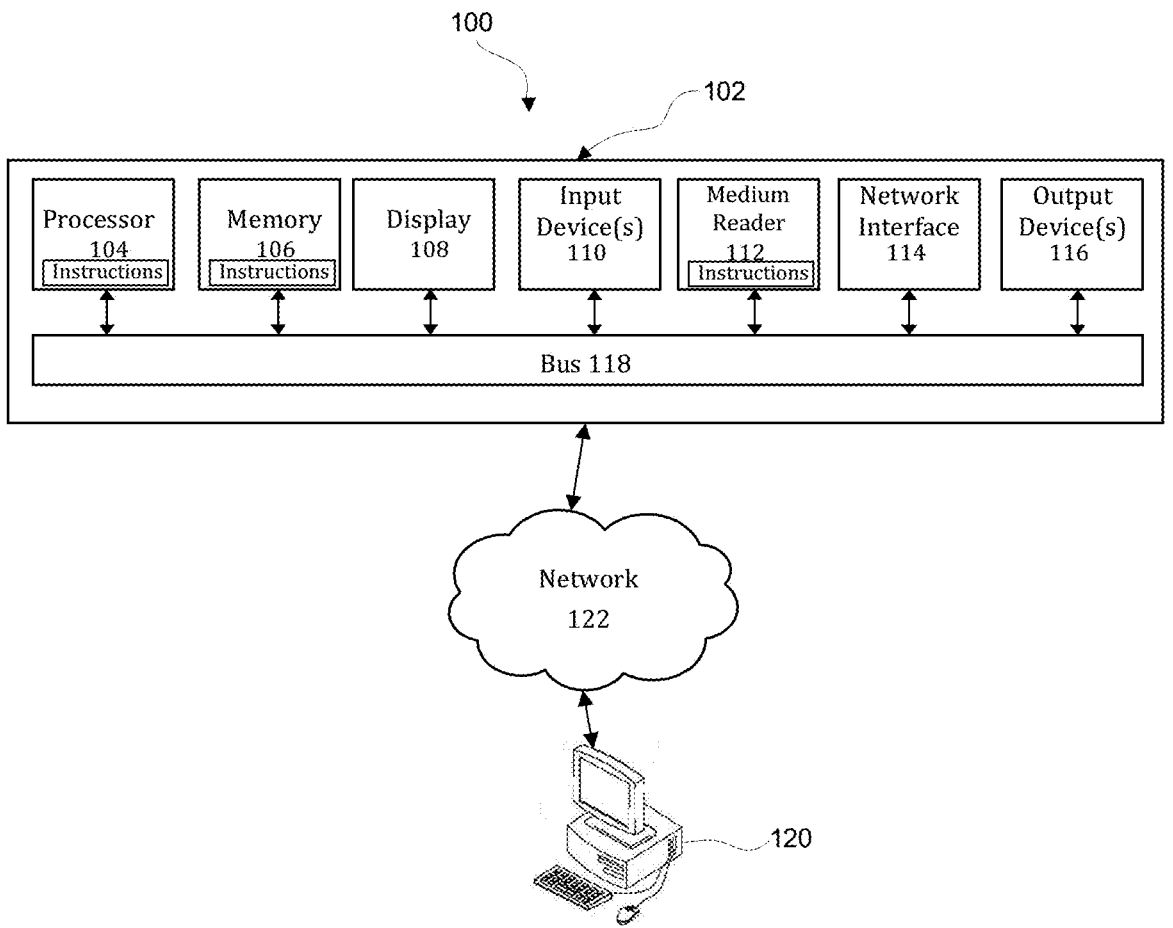
FIG. 1 is a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a Database Activities Tracking Tool that incorporates an auditable layer of database content protection into the management and administration of one or more databases.

Figure 2:
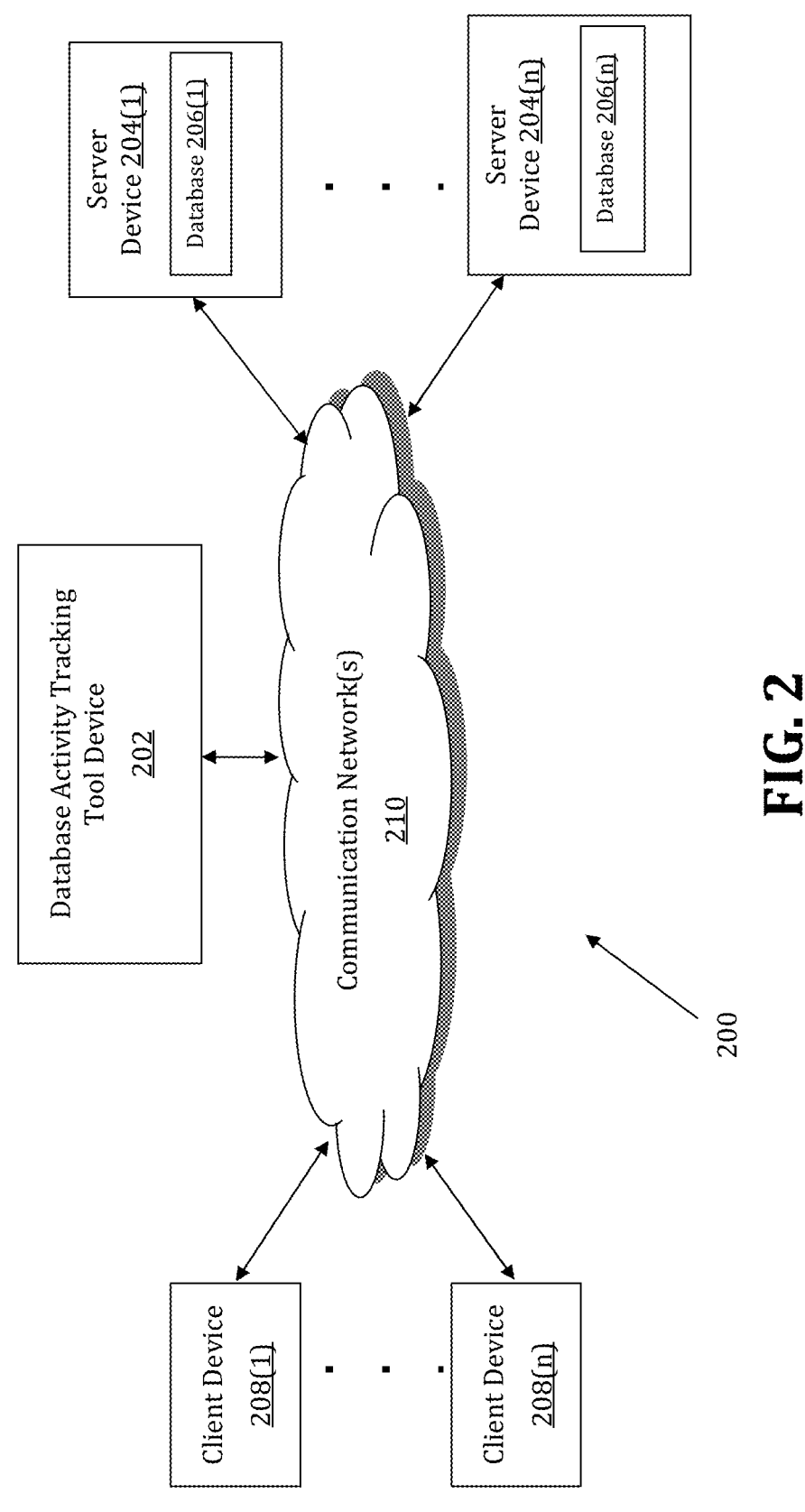
FIG. 2 is a diagram of an exemplary network environment for incorporating an auditable layer of protection into the management and administration of database content.

Referring to FIG. 2, a schematic of an exemplary network environment 200 an exemplary network environment that implements the Database Activities Tracking Tool that incorporates an auditable layer of database content protection into the management and administration of one or more databases. In an exemplary embodiment, the Database Activities Tracking Tool may be implemented on any networked computer platform, such as, for example, a personal computer (PC).

A method for incorporating an auditable layer of database content protection into the management and administration of one or more databases may be implemented by a Database Activities Tracking Tool (DATT) device 202. The DATT device 202 may be the same or similar to the computer system 102 as described with respect to FIG. 1. The DATT device 202 may be a rack-mounted server in a datacenter, an embedded microcontroller (MCU) in an electronic device, or another type of headless system, which is a computer system or device that is configured to operate without a monitor, keyboard and mouse. The DATT device 202 may store one or more applications that can include executable instructions that, when executed by the DATT device 202, cause the DATT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DATT device 202 itself, may be located in virtual server(s) running in a cloud-based computing environment rather than being tied to one or more specific physical network computing devices. Also, the application(s) may be running in one or more virtual machines (VMs) executing on the DATT device 202. Additionally, in one or more embodiments of this technology, virtual machine(s) running on the DATT device 202 may be managed or supervised by a hypervisor.

In the network environment 200 of FIG. 2, the DATT device 202 is coupled to a plurality of server devices 204(1)-204(n) that hosts a plurality of databases 206(1)-206(n), and also to a plurality of client devices 208(1)-208(n) via communication network(s) 210. A communication interface of the DATT device 202, such as the network interface 114 of the computer system 102 of FIG. 1, operatively couples and communicates between the DATT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DATT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and DATT devices that efficiently implement a method for a Database Activities Tracking Tool that improves the overall speed, ease, and user experience of cyber defense capability assessment tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DATT device 202 may be a standalone device or integrated with one or more other devices or apparatuses, such as one or more of the server devices 204(1)-204(n), for example. In one particular example, the DATT device 202 may include or be hosted by one of the server devices 204(1)-204(n), and other arrangements are also possible. As another example, the DATT device 202 may be integrated with one or more other devices or apparatuses, such as one or more of the client devices 208(1)-208(n). Moreover, one or more of the devices of the DATT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DATT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a variety of databases.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DATT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DATT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DATT device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DATT device 202, the server devices 204(1)-204(n), the databases 206(1)-206(n), or the client devices 208(1)-208(n), for example, may be configured to operate as virtual instances on the same physical machine. In other words, one or more of the DATT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer DATT devices 202, server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
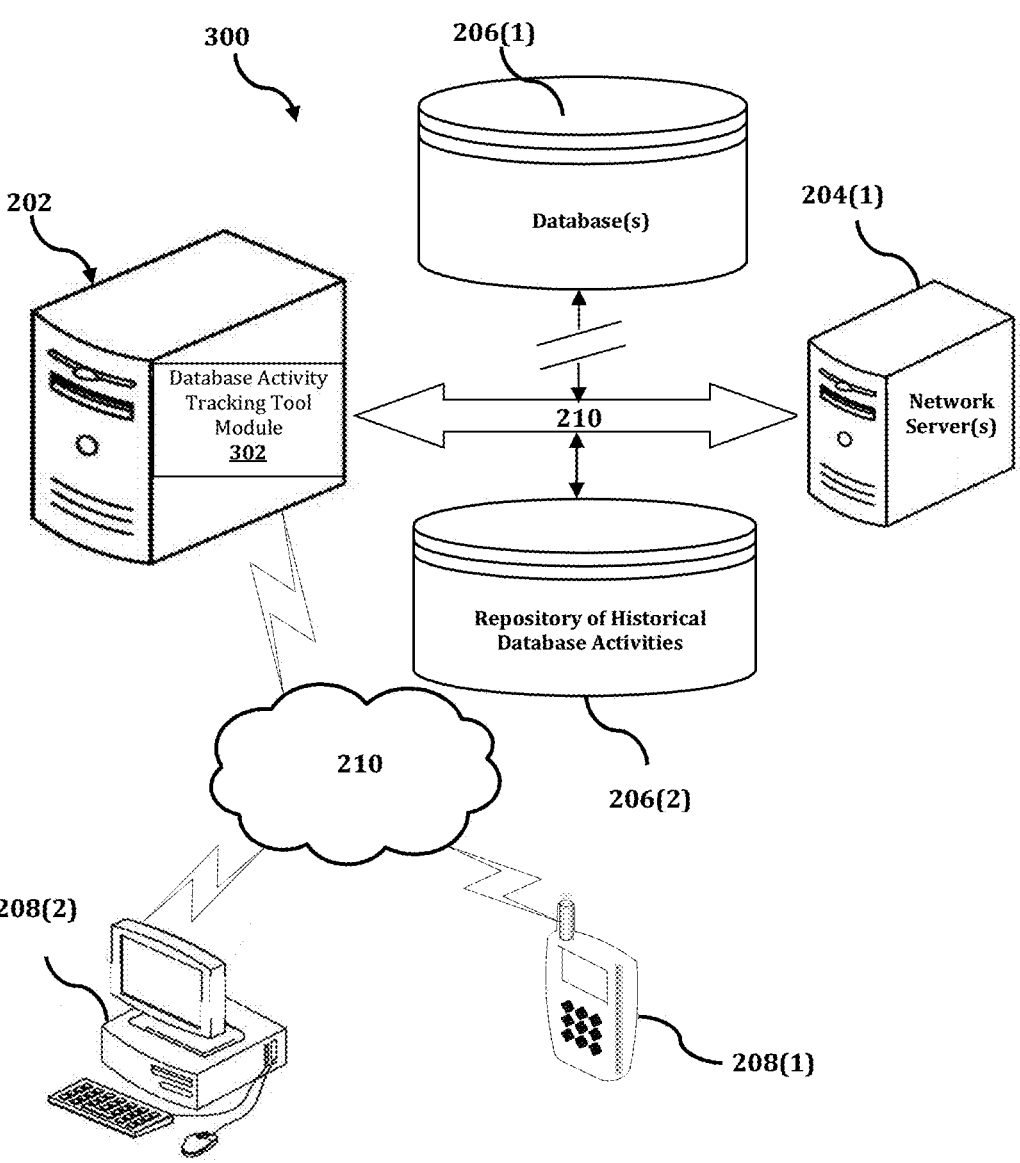
FIG. 3 is a diagram of an exemplary perspective of a network environment that incorporates an auditable layer of protection into the management and administration of database content.

The DATT device 202 is described and illustrated in FIG. 3 as including database activities tracking tool module 302, although it may include other rules, policies, modules, databases, or applications, for example. As will be described below, database activities tracking tool module 302 is configured to incorporate an auditable layer of database content protection into the management and administration of one or more databases. Database activities tracking tool module 302 may include software that is based on a microservices architecture.

Database activities tracking tool module 302 may be integrated with one or more devices or apparatuses, such as client devices 208(1)-208(n), where database activities tracking tool module 302 may be implemented as an application or as an addon or plugin to another application of the one or more devices or apparatuses, and where database activities tracking tool module 302 may execute in the background.

An exemplary process 300 for application of a Database Activities Tracking Tool to an aspect of the network environment of FIG. 2 is illustrated as being executed in FIG. 3. Specifically, a first client device 208(1) and a second client device 208(2) are illustrated as being in communication with DATT device 202. In this regard, the first client device 208(1) and the second client device 208(2) may be "clients" of the DATT device 202 and are described herein as such. Nevertheless, it is to be known and understood that the first client device 208(1) and/or the second client device 208(2) need not necessarily be "clients" of the DATT device 202, or any entity described in association therewith herein. Any additional or alternative relationship may exist between either or both of first client device 208(1), second client device 208(2) and DATT device 202, or no relationship may exist.

Further, DATT device 202 is illustrated as being able to access database(s) 206(1) and repository of historical database activities 206(2). DATT device 202 may comprise a Database Activities Tracking Tool that communicates with database(s) 206(1). In addition, the Database Activities Tracking Tool of DATT device 202 may also communicate with repository of historical database activities 206(2). Database activities tracking tool module 302 may be configured to access these databases in order to incorporate an auditable layer of database content protection into the management and administration of one or more databases.

Moreover, DATT device 202 may receive and transmit data via communication network(s) 210. DATT device 202 may receive and transmit data such as code that is written in one or more of the following dialects: transaction control language (TCL), data manipulation language (DML), data control language (DCL) and data definition language (DFL). Additionally, via communication network(s) 210, DATT device 202 may respectively receive and transmit data from and to one or more from among the following devices: server device 204, database(s) 206(1), repository of historical database activities 206(2) (or another database 206), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the DATT device 202 via broadband or cellular communication. Of course, these embodiments are merely exemplary and are not limiting or exhaustive.

Database activities tracking tool module 302 may execute a process for implementing a Database Activities Tracking Tool that incorporates an auditable layer of database content protection into the management and administration of one or more databases. An exemplary process for implementing a Database Activities Tracking Tool is generally indicated at flowchart 400 in FIG. 4.

In process 400 of FIG. 4, at step S402, database activities tracking tool module 302 monitors a first set of databases to obtain current activities of at least one database from among the first set of databases. At step S402, database activities tracking tool module 302 may monitor the first set of databases continuously or periodically (e.g., every microsecond, thousandth of a second, hundredth of a second, etc.) for an indefinite or predetermined duration of time. The first set of databases may comprise at least a first database such as database(s) 206(1), which may include any type of database (such as one or more electronic relational databases) that may be utilized to store various types of content.

At step S404, database activities tracking tool module 302 obtains a first set of current database activities from the first set of databases. At step S404, the first set of current database activities may be obtained as a result from the monitoring of step S402. In an embodiment, the obtaining of step S404 may also result from a receipt of the first set of current database activities by database activities tracking tool module 302. Alternatively, the obtaining of step S404 may actually be performed by database activities tracking tool module 302 itself. In an exemplary embodiment, the first set of current database activities may comprise at least a first indication (e.g., a log) of a first access to a first record within the first set of databases.

At step S406, database activities tracking tool module 302 determines whether any previous database activities correspond to the first set of current database activities and, thereby, database activities tracking tool module 302 further determines that a first set of previous database activities corresponds to the first set of current database activities. During step S406, database activities tracking tool module 302 may compare the first set of current database activities to historical database activities in order to determine which previous database activities (from among the historical database activities) correspond to the first set of current database activities.

In an embodiment, the historical database activities may comprise every previous database activity that pertains to any of the databases among the first set of databases, and each of these previous database activities may comprise an indication (e.g., a log) of a past instance of accessing at least one database among the first set of databases. In an exemplary embodiment, the historical database activities may be stored within a repository of previous database activities such as repository of historical database activities 206(2).

In an embodiment, the first set of previous database activities may correspond to the first set of current database activities when these sets both concern at least one common database record. Additionally, or alternatively, the first set of previous database activities may correspond to the first set of current database activities when these sets both concern at least one database record that is related to a database record of the other set (i.e., related database records).

In an embodiment, database activities tracking tool module 302 may utilize a first artificial intelligence and machine learning (AI/ML) model to perform the determining (i.e., make the determination) of step S406. In a further embodiment, the historical database activity may have been utilized as training data to train the first AI/ML model to determine whether any previous database activities correspond to the first set of current database activities. In yet an even further embodiment, current database activities may be utilized to update the training data and/or the first AI/ML model.

At step S408, database activities tracking tool module 302 determines a first set of recipients of the first set of previous database activities, and the first set of recipients comprises one or more recipients that correspond to the first set of previous database activities. In an embodiment, the first set of recipients may comprise every recipient that corresponds to any of the previous database activities among the first set of previous database activities.

At step S410, database activities tracking tool module 302 determines that the first set of recipients corresponds to the first set of current database activities. In an embodiment, at step S410, database activities tracking tool module 302 may determine that the first set of recipients corresponds to the first set of current database activities when the first set of previous database activities comprises at least a threshold amount of past instances of accessing a common database record and/or a related database record (such as the common database record and/or related database record describes above) by each of the first set of recipients. However, although the threshold amount of past instances of accessing a common/related database record may be set to a single instances of such past access, alternatively, the threshold amount may instead require more instances (e.g., 2, 3, 4 . . . , etc.) of such past access.

At step S412, database activities tracking tool module 302 transmits a notification of each respective database activity among the first set of current database activities to one or more respective recipients to which the respective database activity corresponds (as determined during step S410). In an exemplary embodiment, the notification may comprise a respective bulletin for each respective current database activity and its corresponding one or more respective recipients.

After step S412, the first set of recipients may respond to the notification(s) (e.g., bulletin(s)) transmitted during step S412 by performing at least from among: correcting any errors resulting from the first set of current database activities, blocking access (to the record of error) of an agent that is responsible for an error resulting from the first set of current database activities, recording the notification, and forwarding the notification to at least one appropriate data integrity agent.

In an embodiment, database activities tracking tool module 302 may generate one or more bulletins that may be transmitted to the first set of recipients at step S412. In a further embodiment, each of the one or more bulletins may be an ad hoc bulletin that is customized for the particulars and details of the bulletin's respective current database activity and corresponding one or more respective recipients. In an embodiment, the corresponding one or more respective recipients may comprise one or more administrators of the first set of databases and/or its content.

In an exemplary embodiment, the corresponding one or more respective recipients may comprise one or more owners of at least one of the records accessed by the first set of current database activities. In an additional or alternate embodiment, the corresponding one or more respective recipients may comprise one or more owners of at least one record that is related to at least one of the records accessed by the first set of current database activities.

In an exemplary embodiment, database activities tracking tool module 302 may utilize the first AI/ML model to perform any, any combination, or all, of the above-mentioned steps (e.g., steps S402, S404, S406, S408, S410 and S412). In a further embodiment, a distinct respective AI/ML model may be used to perform one or more of the steps of process 400 for a respective set of databases. For example, a second AI/ML model may be used to perform one or more of the steps of process 400 for a second set of databases, or a third AI/ML model may be used to perform one or more of the steps of process 400 for a third set of databases, etc.

Accordingly, with this technology, a process for incorporating an auditable layer of protection into the management and administration of database content, is provided by process 400.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for implementing an auditable layer of data protection within a database content management and administration tool, the method comprising:

monitoring a first set of databases to obtain current database activities;

obtaining a first set of current database activities that comprises a first indication of a first access of a first record within the first set of databases;

based on historical first database activities, determining a first set of corresponding recipients that are each respectively associated with a respective set of previous database activities that corresponds to the first set of current database activities, wherein the determining comprises:

comparing each current database activity from among the current database activities against each historical database activity from among the historical first database activities;

when the historical database activity is related to a current database activity record of the current database activity, determining that the historical database activity comprises a corresponding historical database activity; and when at least a threshold amount of corresponding historical database activities originate from a common source, determining that the first set of corresponding recipients comprises the common source; and notifying each corresponding recipient from among the first set of corresponding recipients of the first set of current database activities, wherein the notifying comprises:

generating a first ad hoc bulletin of the first set of current database activities that corresponds to the first set of corresponding recipients; and transmitting the first ad hoc bulletin to each recipient from among the first set of corresponding recipients.

2. The method of claim 1, wherein a first artificial intelligence and machine learning (AI/ML) model is utilized to perform the determining.

3. The method of claim 2, wherein the historical database activity has been utilized to train the first AI/ML model to determine whether the historical database activities correspond to the current database activities.

4. The method of claim 3, further comprising:

monitoring a plurality of sets of databases to obtain the current database activities; and based on respective historical database activities, determining a respective set of corresponding recipients that are each respectively associated with at least one respective previous database activity that corresponds to the current database activities, wherein a plurality of AI/ML models are utilized to perform the determining, and wherein each respective AI/ML model from among the plurality of AI/ML models is respectively utilized to perform the determining for a distinct set from among the plurality of sets of databases to which the respective AI/ML model pertains.

5. The method of claim 1, wherein the determining comprises:

determining that a set of respective sets of previous database activities each respectively correspond to the first set of current database activities;

determining at least one respective recipient of each of the respective sets of previous database activities; and identifying the first set of corresponding recipients, wherein the first set of corresponding recipients comprises each of the at least one respective recipient of each of the respective sets of previous database activities.

6. The method of claim 1, wherein each of the respective set of previous database activities comprises at least a threshold amount of past instances of accessing the first record.

7. The method of claim 1, wherein each of the respective set of previous database activities respectively comprises at least a threshold amount of past instances of accessing at least one respective record that is associated with the first record.

8. The method of claim 1, wherein the first access comprises a first update of the first record.

9. The method of claim 1, wherein the database management and administration tool comprises a database activity subscription engine.

10. The method of claim 1, further comprising:

correcting at least one error that has resulted from the first access to the first record;

blocking, from further access to the first record, a first agent that performed the first access; and forwarding the first set of current database activities to at least one data integrity agent of the first set of databases.

11. A system for implementing an auditable layer of data protection within a database content management and administration tool, the system comprising:

a processor; and memory storing instructions that, when executed by the processor, cause the processor to perform operations comprising:

monitoring a first set of databases to obtain current database activities;

obtaining a first set of current database activities that comprises a first indication of a first access of a first record within the first set of databases;

based on historical first database activities, determining a first set of corresponding recipients that are each respectively associated with a respective set of previous database activities that corresponds to the first set of current database activities, wherein the determining comprises:

comparing each current database activity from among the current database activities against each historical database activity from among the historical first database activities;

when the historical database activity is related to a current database activity record of the current database activity, determining that the historical database activity comprises a corresponding historical database activity; and when at least a threshold amount of corresponding historical database activities originate from a common source, determining that the first set of corresponding recipients comprises the common source; and notifying each corresponding recipient from among the first set of corresponding recipients of the first set of current database activities, wherein the notifying comprises:

generating a first ad hoc bulletin of the first set of current database activities that corresponds to the first set of corresponding recipients; and transmitting the first ad hoc bulletin to each recipient from among the first set of corresponding recipients.

12. The system of claim 11, wherein when the instructions are executed by the processor, a first artificial intelligence and machine learning (AI/ML) model is utilized to perform the determining.

13. The system of claim 12, wherein the historical database activity has been utilized to train the first AI/ML model to determine whether the historical database activities correspond to the current database activities.

14. The system of claim 13, wherein the instructions, when executed, cause the processor to perform further operations comprising:

monitoring a plurality of sets of databases to obtain the current database activities; and based on respective historical database activities, determining a respective set of corresponding recipients that are each respectively associated with at least one respective previous database activity that corresponds to the current database activities, wherein a plurality of AI/ML models are utilized to perform the determining, and wherein each respective AI/ML model from among the plurality of AI/ML models is respectively utilized to perform the determining for a distinct set from among the plurality of sets of databases to which the respective AI/ML model pertains.

15. The system of claim 11, wherein when the instructions are executed by the processor, the determining comprises:

determining that a set of respective sets of previous database activities each respectively correspond to the first set of current database activities;

determining at least one respective recipient of each of the respective sets of previous database activities; and identifying the first set of corresponding recipients, wherein the first set of corresponding recipients comprises each of the at least one respective recipient of each of the respective sets of previous database activities.

16. The system of claim 11, wherein when executed, the instructions by cause the processor to perform further operations that comprise:

correcting at least one error that has resulted from the first access to the first record;

blocking, from further access to the first record, a first agent that performed the first access; and forwarding the first set of current database activities to at least one data integrity agent of the first set of databases.

17. A non-transitory computer-readable medium for implementing an auditable layer of data protection within a database content management and administration tool, wherein the computer-readable medium stores instructions that, when executed by a processor, cause the processor to perform operations comprising:

monitoring a first set of databases to obtain current database activities;

obtaining a first set of current database activities that comprises a first indication of a first access of a first record within the first set of databases;

based on historical first database activities, determining a first set of corresponding recipients that are each respectively associated with a respective set of previous database activities that corresponds to the first set of current database activities, wherein the determining comprises:

comparing each current database activity from among the current database activities against each historical database activity from among the historical first database activities;

when the historical database activity is related to a current database activity record of the current database activity, determining that the historical database activity comprises a corresponding historical database activity; and when at least a threshold amount of corresponding historical database activities originate from a common source, determining that the first set of corresponding recipients comprises the common source; and notifying each corresponding recipient from among the first set of corresponding recipients of the first set of current database activities, wherein the notifying comprises:

generating a first ad hoc bulletin of the first set of current database activities that corresponds to the first set of corresponding recipients; and transmitting the first ad hoc bulletin to each recipient from among the first set of corresponding recipients.

18. The computer-readable medium of claim 17, wherein when the instructions are executed by the processor, a first artificial intelligence and machine learning (AI/ML) model is utilized to perform the determining.

19. The computer-readable medium of claim 18, wherein the historical database activity has been utilized to train the first AI/ML model to determine whether the historical database activities correspond to the current database activities.

20. The computer-readable medium of claim 19, wherein the instructions, when executed, cause the processor to perform further operations comprising:

monitoring a plurality of sets of databases to obtain the current database activities; and based on respective historical database activities, determining a respective set of corresponding recipients that are each respectively associated with at least one respective previous database activity that corresponds to the current database activities, wherein a plurality of AI/ML models are utilized to perform the determining, and wherein each respective AI/ML model from among the plurality of AI/ML models is respectively utilized to perform the determining for a distinct set from among the plurality of sets of databases to which the respective AI/ML model pertains.

* * * * *